United States Patent
Kim et al.

(10) Patent No.: US 9,392,479 B2
(45) Date of Patent: Jul. 12, 2016

(54) POCKET-SIZE PIM INSPECTOR

(71) Applicant: Fluke Corporation, Everett, WA (US)

(72) Inventors: Wonoh Kim, Johns Creek, GA (US); Randy Fischer, Flowery Branch, GA (US); Douglas E. Bain, Braselton, GA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 14/557,047

(22) Filed: Dec. 1, 2014

(65) Prior Publication Data
US 2016/0157115 A1 Jun. 2, 2016

(51) Int. Cl.
*H04W 24/00* (2009.01)
*H04W 24/08* (2009.01)
*H04B 7/26* (2006.01)
*H04W 24/04* (2009.01)
*H04W 24/06* (2009.01)

(52) U.S. Cl.
CPC ............ *H04W 24/08* (2013.01); *H04B 7/2643* (2013.01); *H04W 24/04* (2013.01); *H04W 24/06* (2013.01)

(58) Field of Classification Search
CPC ..... H04W 24/04; H04W 24/06; H04W 24/08; H04B 7/2643
USPC ............ 455/423, 67.11, 115.1, 226.1, 226.2, 455/550.1
See application file for complete search history.

(56) References Cited

U.S. PATENT DOCUMENTS

| | | | | |
|---|---|---|---|---|
| 5,083,080 | A * | 1/1992 | Tagiri | G01R 27/28 324/115 |
| 8,054,088 | B2 * | 11/2011 | Delforce | H04B 17/345 324/612 |
| 8,816,672 | B1 * | 8/2014 | Bradley | G01R 23/16 324/126 |
| 2006/0154635 | A1 * | 7/2006 | Chan | H03F 1/56 455/280 |
| 2009/0125253 | A1 * | 5/2009 | Blair | H04L 43/50 702/57 |
| 2013/0310023 | A1 * | 11/2013 | Bevan | H04B 1/1027 455/423 |
| 2015/0087242 | A1 * | 3/2015 | Bain | H04B 17/0097 455/73 |

* cited by examiner

*Primary Examiner* — Khai M Nguyen
(74) *Attorney, Agent, or Firm* — Locke Lord LLP; Scott D. Wofsy; Christopher J. Capelli

(57) ABSTRACT

A method for detecting passive intermodulation (PIM) using a PIM analyzing device is provided. The PIM analyzing device transmits two signals comprising first and second signals over a signal transmission medium. The PIM analyzing device receives reflected signals associated with the transmitted signals. The PIM analyzing device determines whether the frequencies of the received signals correspond to the calculated PIM signal frequencies.

18 Claims, 5 Drawing Sheets

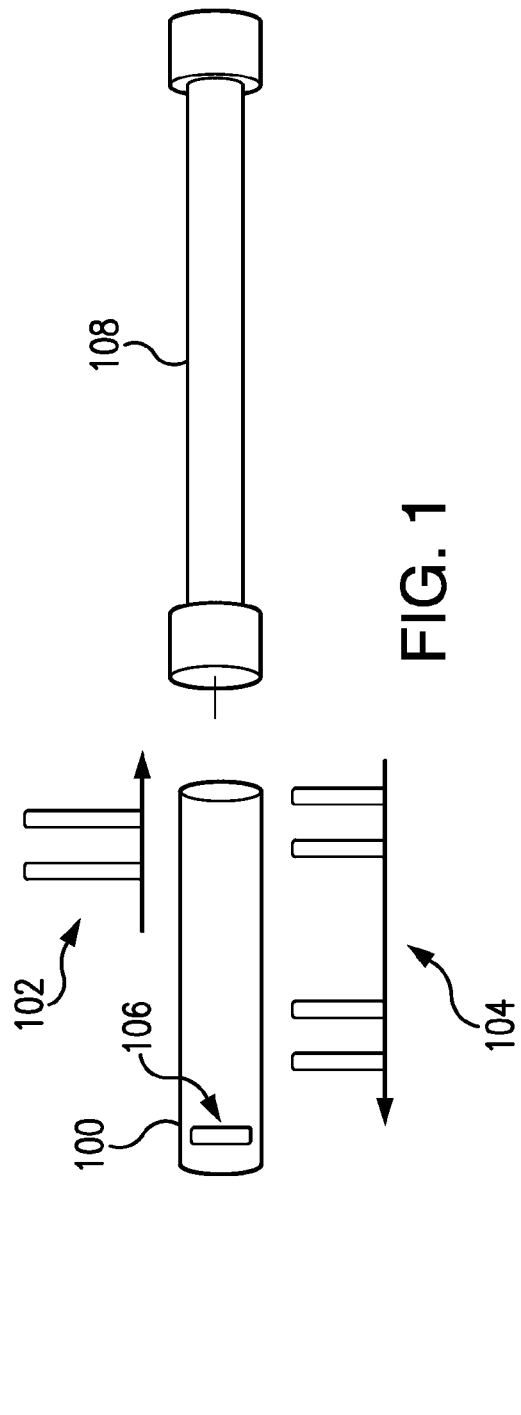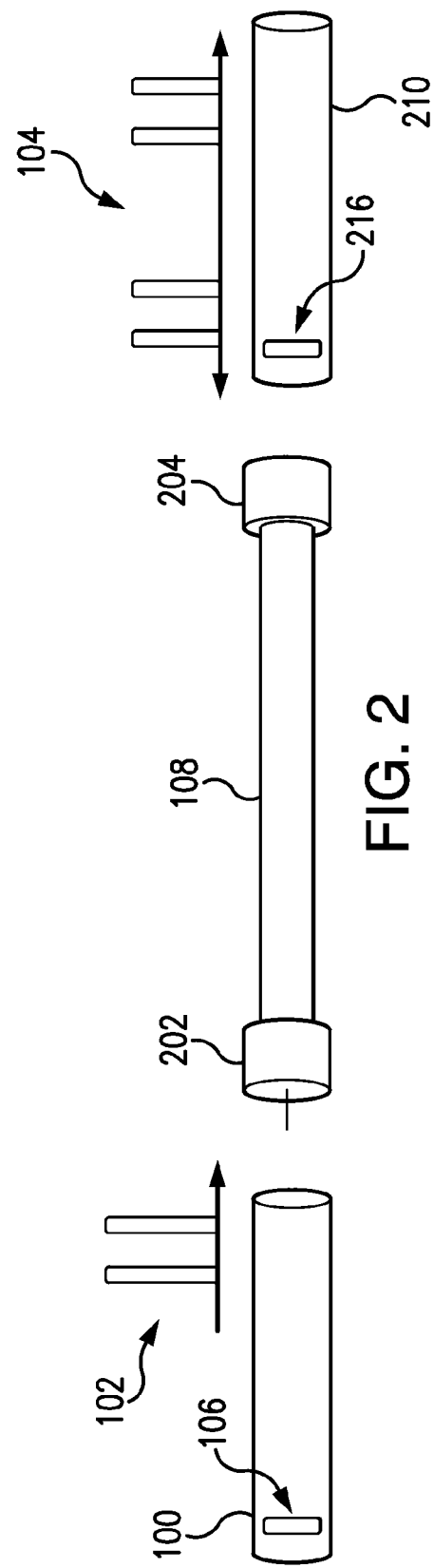

POCKET-SIZE PIM INSPECTOR

FIELD OF THE INVENTION

The present invention relates to detecting radio frequency signal interference, and more particularly to detecting passive intermodulation (PIM) using a portable device.

BACKGROUND OF THE INVENTION

As the use of cellular phones has increased, the likelihood of signal interference has also increased. One cause of signal interference is intermodulation distortion (IMD), such as passive intermodulation (PIM). A PIM is an unwanted signal or signals generated by the non-linear mixing of two or more frequencies in a passive device such as a connector or cable. PIM has surfaced as a problem for cellular telephone technologies such as Global System for Mobile Communications (GSM), Advanced Wireless Service (AWS), Personal Communication Service (PCS) systems, Code Division Multiple Access (CDMA), Universal Mobile Telecommunication System (UMTS), and Long Term Evolution (LTE). Cable assemblies connecting a base station to an antenna on a tower using these cellular systems typically have multiple connectors that cause PIMs that can interfere with system operation. For example, when PIM signals are generated, they can cause interference on the signals at neighboring frequencies, and even other signals out of band. Typically, PIM degrades performance, increases call drop rates and decreases cell coverage.

The PIM signals are created when two signals from the same or different systems mix at a PIM point such as a faulty cable connector. If the generated PIM harmonic frequency components fall within the receive band of a base station, it can effectively block a channel and make the base station receiver think that a carrier is present when one is not. PIMs can, thus, occur when two base stations operating at different frequencies, such as an AWS device and a PCS device, are in close proximity. PIM can also occur when one base station operates according to two or more technologies such as GSM and UMTS or at multiple carrier frequencies.

However, conventional PIM test equipment is relatively expensive and heavy.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a PIM analyzing device including a first and second components is provided. The first component of the portable PIM analyzing device is configured to transmit first and second signals over a signal transmission medium. The second component of the portable PIM analyzing device is configured to receive reflected signals corresponding to the transmitted first and second signals and configured to determine whether the frequencies of the received signals correspond to the PIM signal frequencies associated with the transmitted first and second signals.

In another aspect, a computer program product for detecting PIM using PIM analyzing devices is provided. The computer program product includes one or more computer-readable storage devices and a plurality of program instructions stored on at least one of the one or more computer-readable storage devices. The plurality of program instructions includes program instructions to transmit first and second signals over a signal transmission medium. The plurality of program instructions further includes program instructions to receive reflected signals corresponding to the transmitted first and second signals. The plurality of program instructions further includes program instructions to determine whether the frequencies of the received signals correspond to the PIM signal frequencies associated with the transmitted first and second signals.

BRIEF DESCRIPTION OF THE DRAWINGS

The accompanying appendices and/or drawings illustrate various, non-limiting, examples, inventive aspects in accordance with the present disclosure:

FIG. 1 illustrates a block diagram of an exemplary embodiment of PIM analyzing device for detecting PIM signals, in accordance with an embodiment of the present invention;

FIG. 2 illustrates a pair of PIM analyzing devices that may be utilized for detecting failures related to PIM in electrical cabling assemblies, in accordance with an alternative embodiment of the present invention;

DETAILED DESCRIPTION OF CERTAIN EMBODIMENTS

Figure 3:
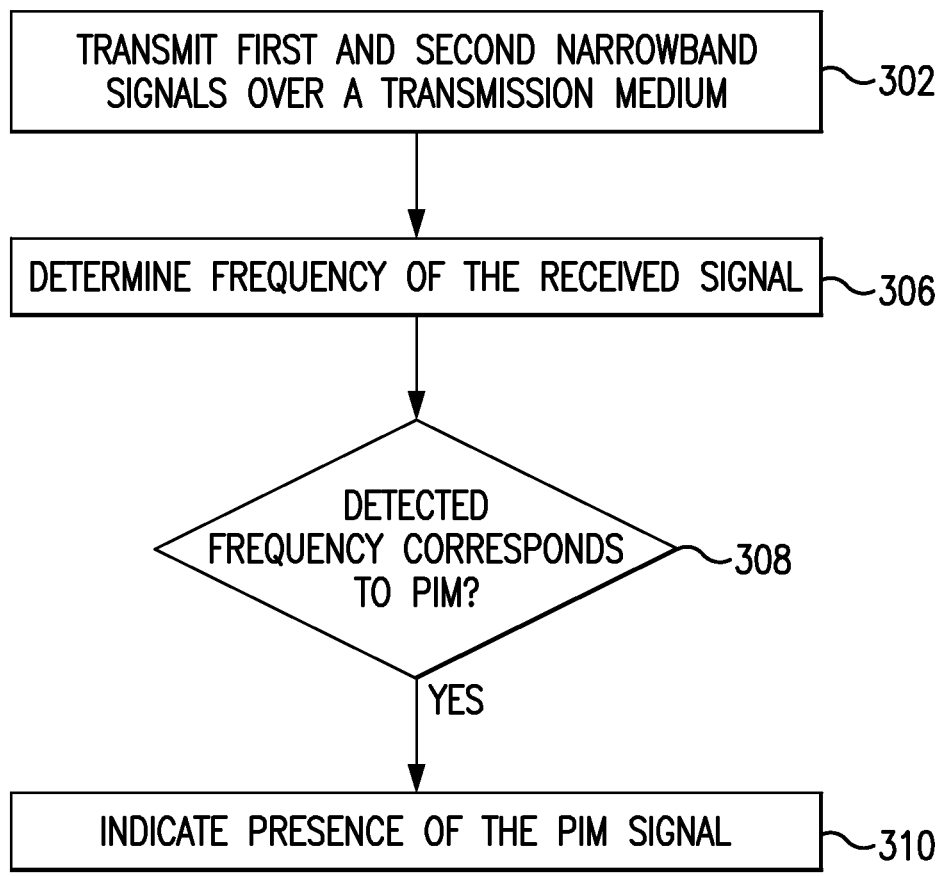
FIG. 3 is a detailed flowchart of operational steps of a PIM analyzing device, in accordance with an illustrative embodiment of the present invention.

The below illustrated embodiments are directed to a method for detecting PIM using a portable PIM analyzing device in which a component or a feature that is common to more than one illustration is indicated with a common reference. It is to be appreciated the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably utilized in conjunction with a software algorithm, program or code residing on computer useable medium having control logic for enabling execution on a device having a computer processor. The device typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the certain embodiments described herein. Thus, the certain embodiments are not to be understood to be limited by what has been particularly shown and described, except as indicated by the appended claims.

PIM testers to date have used CW signals for the two frequencies used to create the PIM. Conventional PIM testers typically include CW signal generators for generating two CW signals and a spectrum analyzer that may be utilized to check PIM signals generated by the two detection CW signals. This is due to the unknown nature of where physically the PIM is located in the transmission path. Thus, conventional PIM testers are relatively expensive. Furthermore, the PIM is typically monitored by a technician climbing a tower with heavy PIM testing equipment which is inconvenient or even dangerous for the climbing technician.

In one aspect, the method described herein allows users to, in an exemplary use, detect IMD, such as PIM, by utilizing portable PIM analyzing devices. In one embodiment, PIM analyzing devices may include a signal generating component and a signal detector as described below. The PIM generating component may be configured to create signals at two different known frequencies, amplify them, and provide them through cables connecting, for example, a base station to antennas on a tower for the base stations. The PIM detector component may be configured to analyze reflected return signals. If the comparison of potential PIM frequencies matches the detected frequencies, then the PIM detector may provide the PIM measurement to an operator.

In another aspect, a pair of PIM analyzing devices may be utilized for detecting failures related to PIM in electrical cabling assemblies. Two PIM analyzing devices (i.e., signal generator and signal detector) are connected to opposite ends of a cable under test. A first PIM analyzing device, namely a signal generating device, transmits first and second signals at one end of the cable under test. The second PIM analyzing device, namely the PIM detector, receives signals at the opposite end of the cable under test. If the comparison of potential PIM frequencies matches the frequencies detected by the second PIM analyzing device, then the PIM detection indication is provided to an operator by the second PIM analyzing device.

Referring to FIG. 1 of the drawings, a diagram illustrates an exemplary device 100 for detecting PIM signals. The PIM analyzing device 100, in accordance with an embodiment of the present invention, is unique in that it combines signal generation, signal acquisition and indication of PIM signal detection, all in a unified portable device that can be easily connected to any terminal that needs to be tested. As shown in FIG. 1, PIM analyzing device 100 may be communicatively coupled to a cable under test 108. The cable 108 of FIG. 1 comprises a current-conducting material that electrically connects various components of a telecommunication system, for example. It may include any current-conducting material or wiring known in the art, including but not limited to copper and other metals having low electrical resistance. In one embodiment, The PIM generating component of the PIM analyzing device 100 is preferably configured to create signals 102 at two different known frequencies, amplify them, and provide them to the cable under test 108. As described in greater detail below, the PIM detector component of the PIM analyzing device 100 is preferably configured to analyze reflected return signals 104. If the comparison of potential PIM frequencies matches the detected frequencies, then the PIM analyzing device 100 preferably utilizes an indicator 106 to indicate to an operator the presence of PIM. In one embodiment, indicator 106 may comprise a blinking LED (light emitting device) located on a housing of the PIM analyzing device 100 for convenient observation. As a non-limiting example, a blinking LED indicator 106 may be subjected to a plurality of identical electrical energy pulses at about one second apart and for a duration of about 40 msecs.

In another aspect, a pair of PIM analyzing devices may be utilized for detecting failures related to PIM in electrical cabling assemblies. FIG. 2 illustrates two PIM analyzing devices 100 and 210 connected to opposite ends 202, 204 of a cable under test 108. A first PIM analyzing device 100 transmits first and second signals 102 at one end 202 of the cable under test 108. The second PIM analyzing device 210 receives reflected signals 104 at the opposite end 204 of the cable under test 108. If the comparison of potential PIM frequencies matches the frequencies detected by the second PIM analyzing device 210, then the PIM presence indication is provided to an operator by a corresponding indicator 216 of the second PIM analyzing device 210. It is noted that both first 100 and second 210 PIM analyzing devices may comprise portable or hand held test instruments enabled to generate and measure PIM signals. PIM analyzing devices 100, 210 may cooperate to effect testing, and may comprise either both active test instruments or an active and more passive test instrument, with the active instrument (e.g., second PIM analyzing device 210) controlling the testing.

Figure 4:
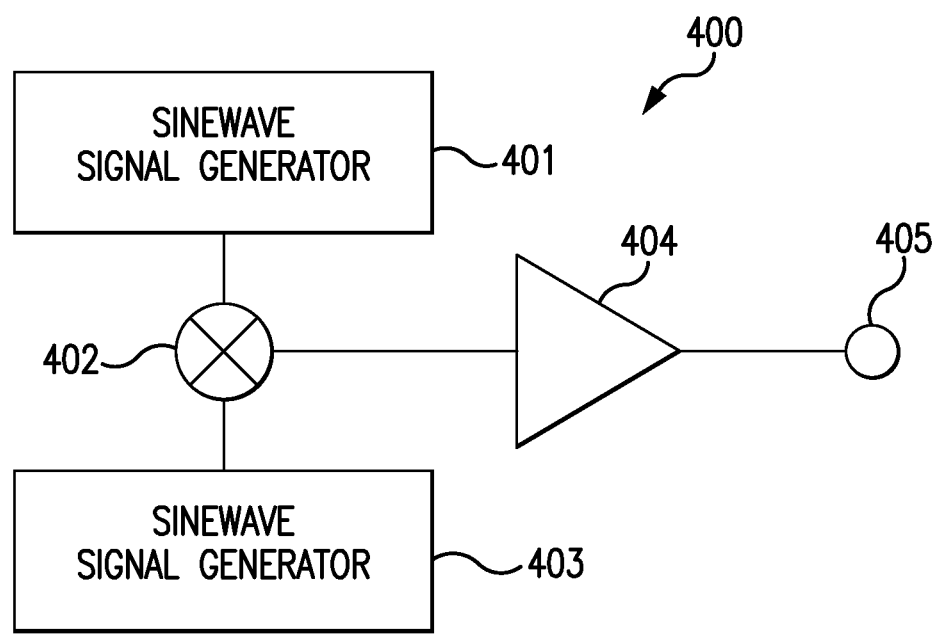
FIGS. 4 and 5 are circuit diagrams illustrating some of the internal components of the PIM analyzing devices of FIGS. 1-2, in accordance with an illustrative embodiment of the present invention.

Referring now to FIG. 4, an exemplary PIM signal generating component 400 of the exemplary PIM generating device 100 according to one embodiment is illustrated in circuit diagram form. In the illustrated embodiment, PIM signal generating component 400 may include two sine wave signal generators 401 and 403. The generated signals supplied by signal generators 401 and 403 will intermodulate and should cause PIM in a Device Under Test ("DUT"), such as, but not limited to a cable under test. The PIM product is typically the result of the two (or more) high power tones mixing at device nonlinearities such as junctions of dissimilar metals, metal-oxide junctions and even loose connectors. The higher the signal amplitudes, the more pronounced the effect of the nonlinearities, and the more prominent the intermodulation that occurs—even though upon initial inspection, the system would appear to be linear and unable to generate intermodulation.

Accordingly, a first sine wave signal generator 401 may generate a first clock pulse signal having a first predetermined frequency, $f_1$, and a second sine wave signal generator 403 may generate a second clock pulse signal having a second predetermined frequency $f_2$. Sine wave generators 401, 403 may be implemented in either analog or digital circuits. Additionally, sine wave generators 401, 403 may be implemented by discrete circuits or by microprocessors. In one embodiment, sine wave generators 401, 403 may be implemented in one digital chip that generates both sine wave signals having predetermined frequencies $f_1$ and $f_2$.

In one embodiment, both signals generated by sine wave generators 401 and 403 may be supplied to a signal mixing circuit 402 which mixes input signals to provide a combined signal. The combined signal supplied by signal mixing circuit 402 may be modulated by an RF amplifier 404 to produce an RF signal for transmission. RF amplifiers are generally known and, for the sake of brevity, details of their operation will not be described herein. RF amplifier 404 is preferably coupled to RF transmitter 405 and terminal including it or some other wireless communications module which can be separate from or integrated with (as depicted) PIM signal generating component 400 in various embodiments.

Figure 5:
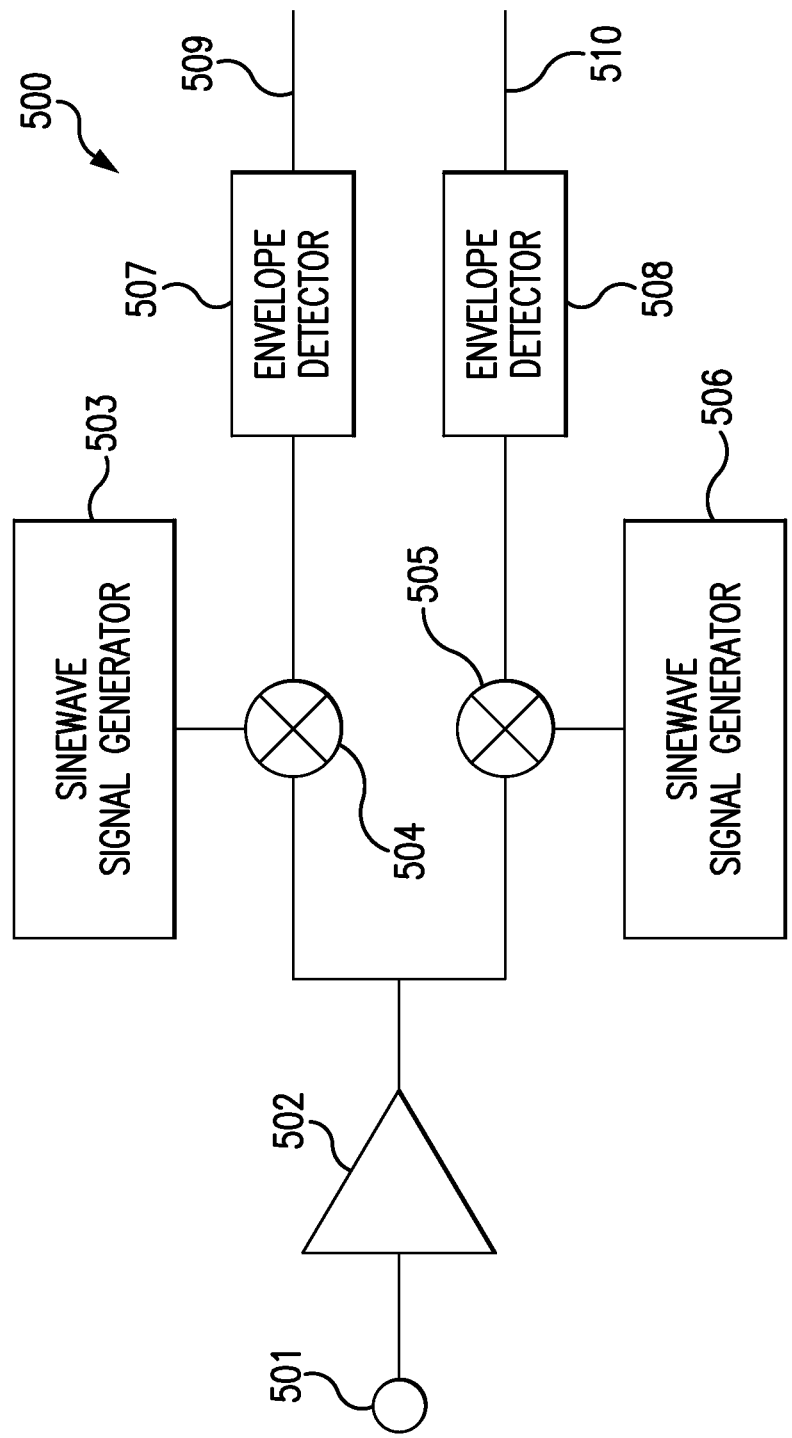

FIG. 5 shows a circuit diagram of an exemplary PIM detection component 500 of the exemplary PIM generating device 100, in accordance with an embodiment of the present invention. The exemplary PIM detection component 500 may include an input terminal 501 adapted to receive an RF signal from an external source. In this embodiment, RF amplifier 502 may be used for pre-amplifying RF signals received from input terminal 501 before providing the amplified signals to a pair of mixers (signal mixing circuits) 504 and 505. Each mixer may be further coupled to a corresponding sine wave signal generator. In other words, first mixer 504 may be coupled to RF amplifier 502 and first sine wave signal generator 503, while second mixer 505 may be coupled to RF amplifier 502 and second sine wave signal generator 506.

According to an embodiment of the present invention, first sine wave signal generator 503 and second sine wave signal generator 505 may be tuned to a predetermined frequencies. In a preferred embodiment, these frequencies may comprise third-order PIM signal frequencies. Third-order PIM frequency signals result from a combination of exactly three instances of signals, such as two instances of $f_1$ and one instance of $f_2$. More particularly, third-order PIM frequencies may be produced via:

(1) $f_1$;
(2) $f_2$;
(3) $3*f_1$;
(4) $3*f_2$;
(5) $2*f_1+f_2$;
(6) $|2*f_1-f_2|$;
(7) $2*f_2+f_1$; and
(8) $|2*f_2-f_1|$.

Generally speaking, although not necessarily, third-order PIM "in band" signals (i.e., signals (6) and (8) above) are of the most concern because they are closest to the origin signals and difficult to remove by filtering, although fifth-order PIM signals are also contemplated by various embodiments of the present invention.

Accordingly, continuing the example discussed above, if sine wave signal generators 401 and 403 of PIM signal generating component 400 (shown in FIG. 4) generated signals having frequencies $f_1$ and $f_2$, respectively, then sine wave signal generators 503 and 506 of the PIM detection component 500 will be tuned to generate 3-rd order PIM signals, for example $f_1-2f_2$ and $2f_2-f_1$, respectively. As previously indicated, each of the generated 3-rd order PIM signals may be supplied to one of the mixers 504 and 505 to be combined with RF signals received from RF amplifier 502. As shown in FIG. 5, the output of the mixers 504 and 505 is fed to a pair of corresponding envelope detectors 507 and 508 where one of the high or low levels of the corresponding signal is envelope detected to provide a resulting differential signal. Advantageously, each output signal 509, 510 of the envelope detectors 507 and 508 corresponds to the signal levels of aforementioned third-order PIM frequencies.

FIG. 3 is a detailed flowchart of operational steps of the PIM analyzing devices discussed above, in accordance with an illustrative embodiment of the present invention. Before turning to description of FIG. 3, it is noted that the flow diagram in FIG. 3 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more steps may be omitted. In some embodiments, one or more additional steps may be performed. As will be appreciated by one skilled in the art, aspects of the present invention may be embodied as a method or computer program product.

Cellular communication systems can be based on a variety of different cellular standards employing Frequency Division Multiple Access (FDMA), Time Division Multiple Access (TDMA), and the like. These cellular communication systems use frequency modulation to transmit speech and data information on a variety of different radio channel frequencies. The channel spacing between the different radio channel frequencies used in a cellular communication system varies depending on the cellular standard employed. Wideband cellular standards such as IS-95 and GSM require wide channel spacing to receive wideband frequency-modulated signals ("wideband signals"), while narrowband cellular standards such as NAMPS and the IS-54 standard require a narrower channel spacing to receive narrowband frequency modulated signals ("narrowband signals").

According to an embodiment of the present invention, in order to detect PIM in a cellular communication system, at step 302, PIM analyzing device 100 may generate two signals having two different predetermined frequencies. In a preferred embodiment the two signals generated at step 302 may comprise narrowband signals. For example, the narrowband signals can be transmissions in a frequency division multiple access system (FDMA) or time division multiple access transmissions (TDMA). An example of a narrowband TDMA system is the U.S. Digital cellular system conforming to the telecommunications Industry Association standard IS-54. This standard is an example of narrowband TDMA waveforms and protocols. As shown in FIG. 1, these two signals 102 generated by PIM analyzing device 100 may be transmitted through cable under test 108. For illustrative purposes only, and without limitation, two active cellular communication signals may be transmitted at frequencies of 470 MHz (first active signal, $f_1$) and 480 MHz (second active signal, $f_2$). If they generate IMD, such as PIM, they may cause interference to other signals.

At step 306, PIM analyzing device 100 may determine the frequencies of the received reflected signals 104 shown in FIG. 1. Advantageously, there is no need to scan the entire frequency range. Instead, in one embodiment, PIM analyzing device 100 is pre-configured to detect only third-order PIM signals corresponding to the original signals generated at step 302. More particularly, and continuing the same example using original signals 470 MHz ($f_1$) and 480 MHz ($f_2$) the envelope detectors 507 and 508 of PIM analyzing device 100 may monitor predetermined fixed PIM frequencies or channels. In this particular example, these monitored PIM frequencies may include third-order PIM "in band" signals (i.e., signals at 450 MHz, 460 MHz in the above example). If there are signals at the potential PIM frequencies, PIM analyzing device 100 identifies these signals as PIM signals.

In response to identifying a corresponding match (step 308, yes branch), at step 310, the match may be communicated as a graphical indication of a detected PIM signal by PIM analyzing device 100. In some embodiments, PIM analyzing device 100 may include a pass/fail LED indicator 106.

Figure 6:
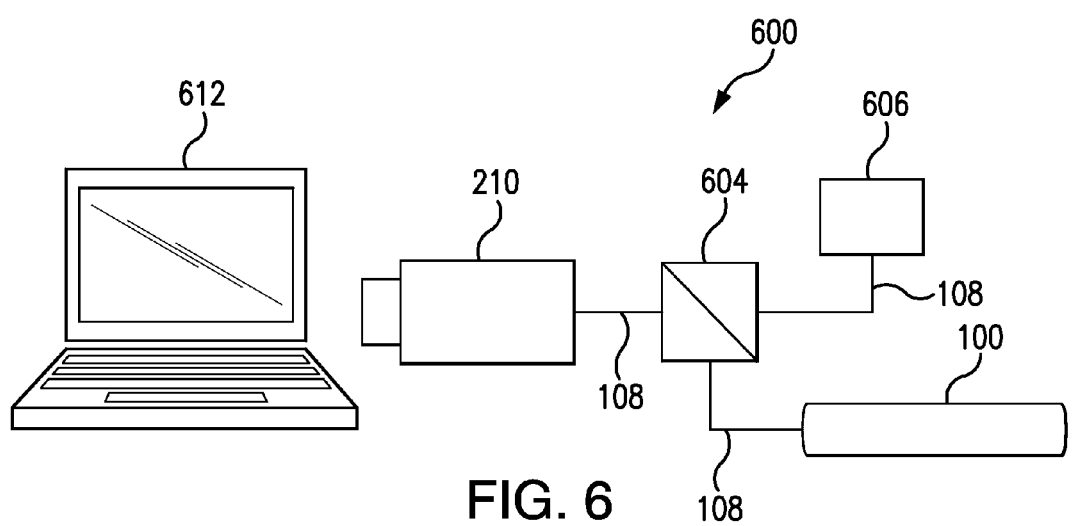
FIG. 6 illustrates a system diagram of an exemplary embodiment of PIM analyzing device employed for detecting PIM signals from an active cellular transceiver.

Referring now to FIG. 6 of the drawings, an exemplary use of PIM analyzing device 100 for detecting PIM signals from an active cellular transceiver is illustrated in a diagram form. In one embodiment, system 600 includes first PIM analyzing device 100 and wire 108 that communicatively connects first PIM analyzing device 100 via splitter 604 to a radio transceiver 606 that includes an antenna. First PIM analyzing device 100 may also be communicatively connected by wire 108 via splitter 604 to a second PIM analyzing device 210, which may be used for PIM measurement purposes. In one embodiment, first PIM analyzing device 100 may be used as a signal generator and may utilize two signal sources, with a first signal source producing a signal at a first predetermined frequency and the second signal source producing a signal at a second predetermined frequency. In various embodiments of the present invention, first PIM analyzing device 100 and second PIM analyzing device 210 may comprise portable handheld devices.

In the embodiment illustrated in FIG. 6, signal splitter 604, also known as a power splitter, may comprise a two-way splitter, which distributes the signals generated by first PIM analyzing device 100 equally between second PIM analyzing device 210 and radio transceiver 606.

In an alternative embodiment radio transceiver 606 may comprise a distributed antenna system (DAS). In this alternative embodiment, splitter 604 may divide the received signals for distribution to several antennas 606. The splitter 604 distributes signals equally to multiple antennas and is normally a passive component that has one input and several outputs. Splitter 604 is an RF component which cannot amplify the input signal and splits it at the output only. By way of example, in case of a 2-way splitter, splitter 604 splits the input signal power into two equal output powers, whereas, in case of a 3- or 4-way splitter, splitter 604 splits the input signal in three and four equal output power signals, respectively. The 4-way splitter, by way of example, splits power fed at its input equally to each of the four antennas connected to the respective output port.

Transceiver 606 may be configured to emit signals, which may include two active cellular communication signals. In one embodiment, transceiver 606 may comprise a base transceiver station of a radio mobile telephone network equipped with a transceiving antenna serving users mobile terminals covering a specific geographical area called "radio cell", representing the center of virtual "umbrella" coverage of radio signals. In substance, base transceiver station 606 constitutes therefore the base of the cellular telephony infrastructure, used in radio connections of mobile cellular networks at the radio interface of the cellular system. As noted above, in the alternative embodiment, transceiver 606 may comprise DAS.

In one embodiment, second PIM analyzing device 210 may comprise a spectrum analyzer. A spectrum analyzer scans, or 'sweeps' the desired range of frequencies, then normally plots the strengths of the signals received in the vertical axis against the scanned frequencies on the horizontal axis. The result of such a sweep is shown on a graphic display to enable a user to graphically see the full spectrum that is analyzed. Spectrum analyzers are specialized test instruments that often cover broad ranges of frequencies. Conventional spectrum analyzers focus on features that enhance the accuracy of measurements, such as: sweep time, resolution bandwidth and frequency range. These features often require specialized hardware. For instance, conventional spectrum analyzers typically contain dedicated hardware capable of quickly taking precise measurements. However, this specialized hardware is typically bulky and expensive. According to a preferred embodiment of the present invention, second PIM analyzing device 210 may comprise a portable handheld device and may be used merely for determining if PIM is present by performing measurements at the desired range of frequencies, as described above in conjunction with FIGS. 3 and 5. In some embodiments, PIM detection data as obtained from second PIM analyzer 210 may be analyzed by computer 612.

In summary, embodiments of the present invention are directed to a simple, low cost, light-weight and easy to mass produce (preferably pocket size) PIM analyzing device. This small and light-weight design of PIM analyzing device enables users (e.g., technicians) to carry the device in their pockets when they climb a cell tower and enables users to detect PIM disturbances with less effort as compared to conventional PIM testers. PIM analyzing devices disclosed herein may be utilized in testing conventional cellular systems and DAS systems. In addition, such PIM analyzing devices may be used, for example, by cable and connector manufacturers to demonstrate that their products are substantially PIM-free at trade shows and/or sales meetings.

As will be appreciated by one skilled in the art, aspects of the present invention may be embodied as a method or computer program product. Accordingly, aspects of the present invention may take the form of an entirely software embodiment. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a random access memory (RAM), a read-only memory (ROM), an erasable programmable read-only memory (EPROM or Flash memory), an optical fiber, an optical storage device, a magnetic storage device, or any suitable combination of the foregoing. In the context of this document, a computer readable storage medium may be any tangible medium that can contain, or store a program for use by or in connection with a PIM analyzing device.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A handheld passive intermodulation (PIM) analyzing device comprising:
a first and second components, wherein:
the first component of the handheld PIM analyzing device is configured to transmit first and second signals over a signal transmission medium; and
the second component of the handheld PIM analyzing device is configured to receive reflected signals corresponding to the transmitted first and second signals and configured to determine whether the frequencies of the received signals correspond to PIM signal frequencies associated with the transmitted first and second signals.

2. The PIM analyzing device of claim 1, wherein the first signal has a first predetermined frequency and the second signal has a second predetermined frequency.

3. The PIM analyzing device of claim 1, wherein the first and second signals comprise narrowband signals.

4. The PIM analyzing device of claim 3, wherein the first and second signals comprise time division multiple access transmissions (TDMA) signals.

5. The PIM analyzing device of claim 1, wherein the PIM signal frequencies associated with the transmitted first and second signals comprise at least third-order PIM signal frequencies that might be caused by the combined first and second signals.

6. The PIM analyzing device of claim 1, wherein the PIM analyzing device further comprises a visual indicator configured to indicate presence of the detected PIM signals via an identifiable signal.

7. The PIM analyzing device of claim 6, wherein the visual indicator comprises a light emitting diodes (LED), and wherein the identifiable signal comprises a blinking pattern.

8. A computer program product for detecting passive intermodulation (PIM), the computer program product comprising:
one or more computer-readable storage devices and a plurality of program instructions stored on at least one of the one or more computer-readable storage devices, the plurality of program instructions comprising:
program instructions to transmit first and second signals over a cellular transmission medium using a first component of a handheld PIM analyzing device;
program instructions to receive reflected signals corresponding to the transmitted first and second signals using a second component of the handheld PIM analyzing device; and
program instructions to determine whether the frequencies of the received signals correspond to PIM signal frequencies associated with the transmitted first and second signals using the second component of the handheld PIM analyzing device.

9. The computer program product of claim 8, wherein the first signal has a first predetermined frequency and the second signal has a second predetermined frequency.

10. The computer program product of claim 8, wherein the first and second signals comprise narrowband signals.

11. The computer program product of claim 8, wherein the PIM signal frequencies associated with the transmitted first and second signals comprise at least third-order PIM signal frequencies that might be caused by the combined first and second signals.

12. The computer program product of claim 8, further comprising program instructions to generate a visual signal to indicate presence of the PIM signals.

13. A method for detecting passive intermodulation (PIM) using a portable PIM analyzing device, the method comprising the steps of:
transmitting, by a first component of the portable PIM analyzing device, first and second signals over a signal transmission medium under test;
receiving, by a second component of the portable PIM analyzing device, reflected signals corresponding to the transmitted first and second signals;
determining, by the second component of the portable PIM analyzing device, whether the frequencies of the received signals correspond to the PIM signal frequencies associated with the transmitted first and second signals.

14. The method of claim 13, wherein the first signal has a first predetermined frequency and the second signal has a second predetermined frequency.

15. The method of claim 13, wherein the first and second signals comprise narrowband signals.

16. The method of claim 13, wherein the PIM signal frequencies associated with the transmitted first and second signals comprise at least third-order PIM signal frequencies that might be caused by the combined first and second signals.

17. The method of claim 13, further comprising generating a visual signal indicating presence of the PIM signals to a device operator.

18. The method of claim 15, wherein the first and second signals comprise time division multiple access transmissions (TDMA) signals.

* * * * *